July 3, 1945. C. HERZOG 2,379,485
ROTARY OVEN
Filed Sept. 16, 1943 2 Sheets-Sheet 1
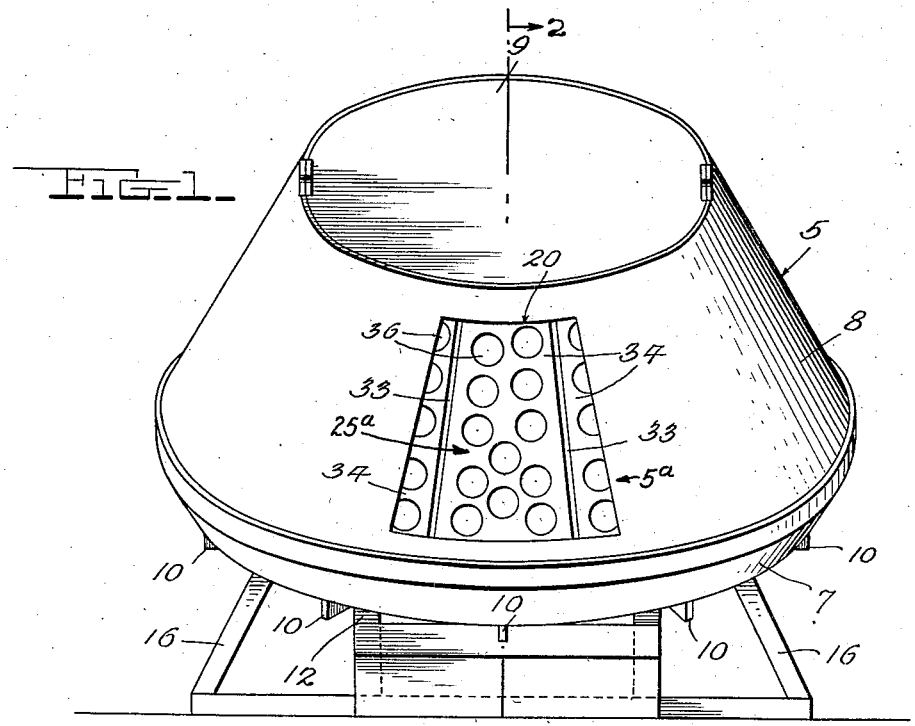
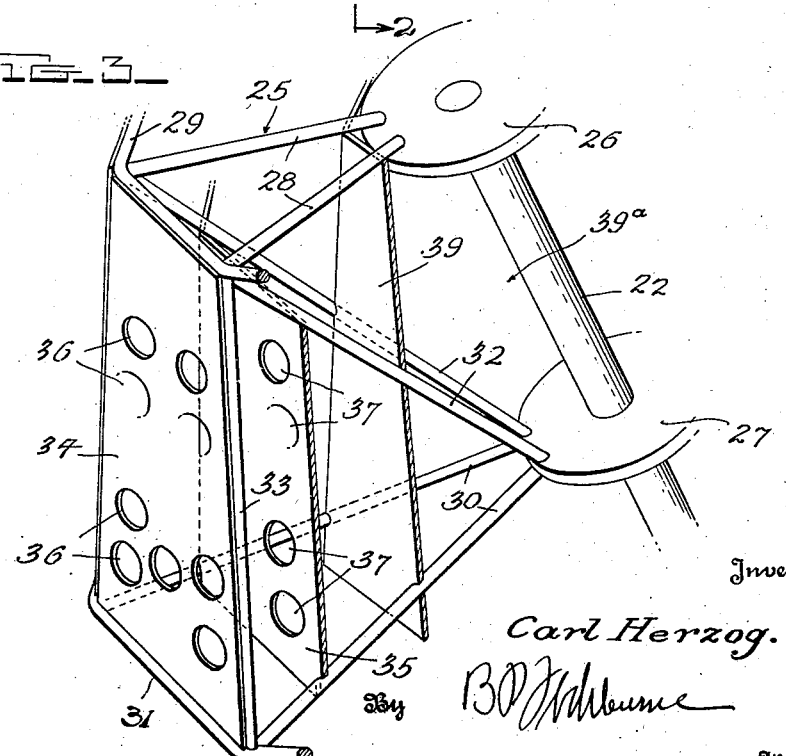
Inventor
Carl Herzog.
By BD Milburn
Attorney July 3, 1945. C. HERZOG 2,379,485
ROTARY OVEN
Filed Sept. 16, 1943 2 Sheets-Sheet 2
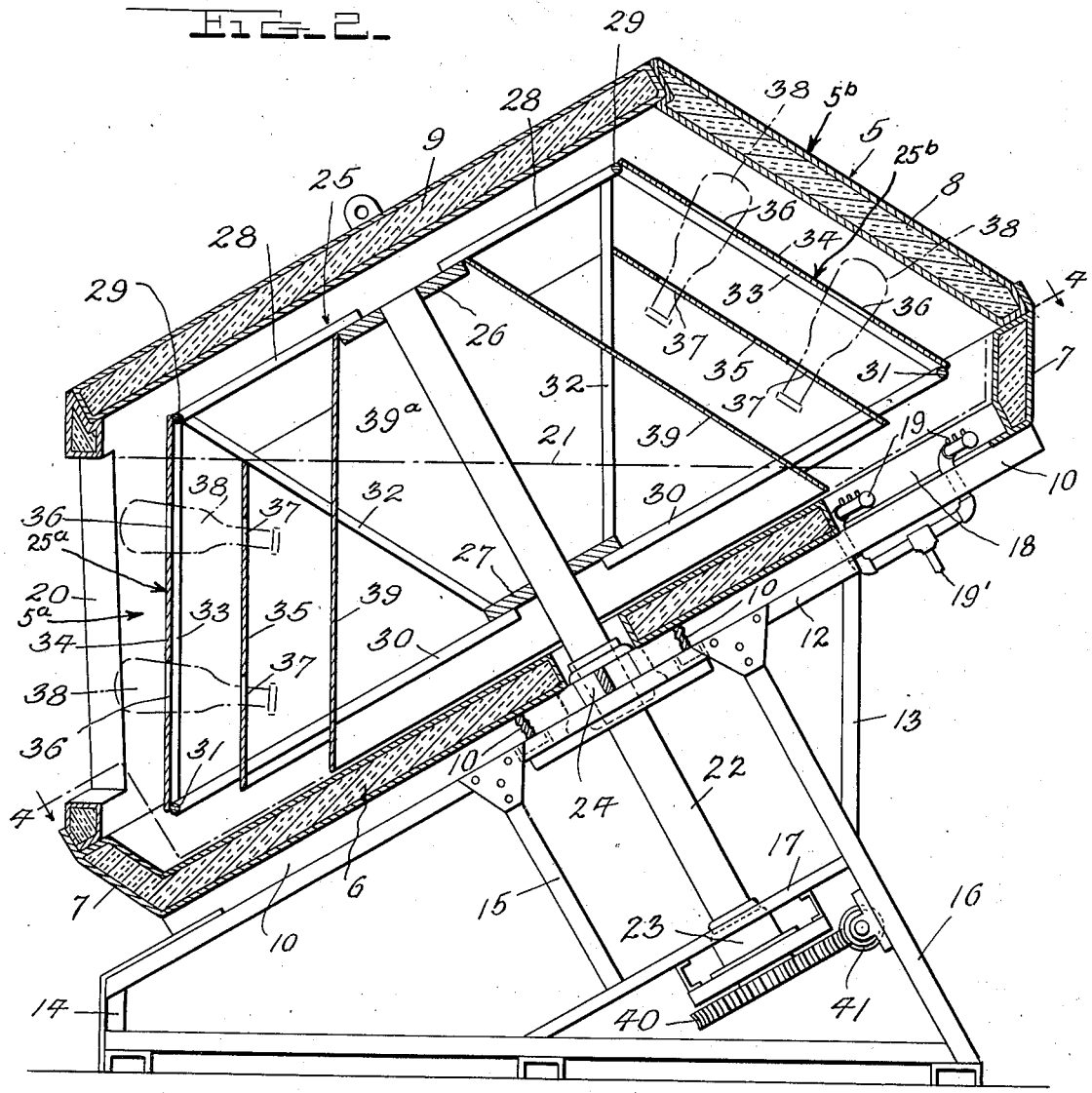
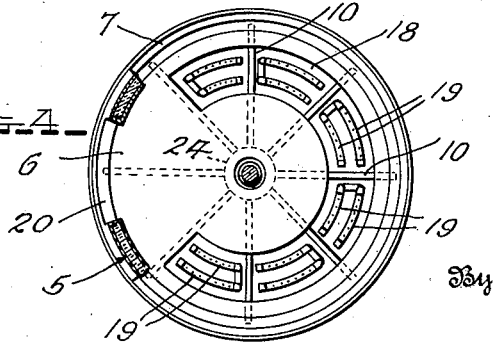
Inventor
Carl Herzog.
By
Attorney Patented July 3, 1945

2,379,485

UNITED STATES PATENT OFFICE 2,379,485

ROTARY OVEN

Carl Herzog, Belleville, N. J.

Application September 16, 1943, Serial No. 502,687

9 Claims. (Cl. 49—47)

My invention relates to ovens for annealing or baking articles.

An important object of the invention is to provide a rotary oven which is loaded and unloaded from the same point.

A further object of the invention is to provide an oven of the above mentioned character which is well adapted for baking articles, such as glass articles, to gradually bring the temperature of such glass articles up to a high temperature and then gradually reduce the high temperature, before unloading the articles, thereby preventing temperature strains.

A further object of the invention is to provide an oven of the above mentioned character having a rotary carrier or rack turning about a vertically inclined axis, whereby the articles held by the rack are caused to travel in a circular path within the oven casing while being first elevated and then lowered.

A further object of the invention is to provide means for trapping hot gases in the top of the oven casing for forming a hot zone and a cool zone at the bottom of the casing, with a rotary carrier turning about a vertically inclined axle to move the articles upwardly from the cool zone into the hot zone and downwardly from the hot zone into the cool zone.

A further object of the invention is to locate the opening of the inclined casing at a low elevation and to so arrange the burners that the minimum heat is produced in proximity to the opening.

Other objects and advantages of the invention will be apparent during the course of the following description.

In the accompanying drawings, forming a part of this application and in which like numerals are employed to designate like parts throughout the same, Figure 1 is a front elevation of an oven embodying my invention, Figure 2 is a vertical section taken on line 2—2 of Figure 1, Figure 3 is a perspective view of the rack or carrier, parts broken away, and Figure 4 is a section, upon a reduced scale, taken on line 4—4 of Figure 2.

In the drawings, wherein for the purpose of illustration is shown a preferred embodiment of my invention, the numeral 5 designates a stationary oven casing as a whole, which is preferably circular in cross section in a plane at a right angle to the central longitudinal axis of the casing. The casing is formed of heat insulating and resisting material. This oven casing includes a bottom 6, provided with an upstanding annular marginal portion 7, connected with an annular side portion or periphery 8, which tapers upwardly, carrying a top 9. The bottom, side portion or periphery and top of the casing are concentric, and the casing has its central longitudinal axis vertically inclined, as shown. The top 9 and bottom 6 are parallel. The bottom 6 is rigidly mounted upon radial beams 10, rigidly mounted upon a vertically inclined top 12 of a supporting frame. The top 12 is connected with vertical legs 13 and 14 and diagonal legs 15 and 16. Connected with the diagonal legs 16 is an inclined portion 17, parallel with the top 12. The side portion or periphery has a lower arranged portion 5ᵃ and an upper arranged portion 5ᵇ.

The bottom 6 is provided with a circularly curved opening 18, having its ends spaced and disposed near the lower arranged portion 5ᵃ of the side portion or periphery 8. The curved opening 18 also extends adjacent to the upper arranged portion 5ᵇ of the periphery 8. Within this opening 18 are burners 19, such as gas burners, for supplying heated gases into the oven casing 5, as shown. These burners are in a circularly curved group. The oven casing 5 is provided with an uncovered opening 20, formed in the lower arranged portion 5ᵃ of the side portion or periphery 8. The opening 20 is disposed between the ends of the opening 18, and the burners 19 adjacent to the ends of the opening 18 are disposed upon opposite sides of the opening 20 and spaced therefrom. The vertical opening 20 extends to points adjacent to the top and bottom of the side portion or periphery.

The heated gases from the burners travel upwardly within the casing 5 and are trapped in the upper portion of the same, forming an upper hot zone, having its bottom indicated by a horizontal line 21, which passes through the top of the opening 20, and a cool zone beneath the line 21. The opening 20 is uncovered and the heated gases which are not trapped in the upper portion of the casing can discharge through the opening 20. Since the burners 19 at the ends of the opening 18 are spaced laterally from the opening 20, these burners produce the minimum heat in proximity to the opening 20.

The numeral 22 designates a vertically inclined rotary shaft, which is arranged concentrically within the oven casing 5, and coincides with the central longitudinal axis of the oven casing. The shaft 22 is preferably inclined for about 30° from the perpendicular, although the inclination may be varied. At its lower end, the shaft 22 is journaled in a bearing 23 which is held stationary to the portion 17. Adjacent to the oven bottom 6, the shaft 22 is journaled in a bearing 24, fixedly secured to the beams 10. The shaft 22 is free to rotate but is held against axial movement. Mounted within the vertically inclined casing 5 is a vertically inclined rack or carrier 25, which is concentric with relation to the casing 5 and has the the same vertical inclination. This carrier or rack is circular in cross section in a plane at a right angle to its central axis of rotation. The carrier or rack includes hubs 26 and 27, rigidly mounted upon the shaft 22, which constitutes the axis of rotation of the carrier. Upper radial arms 28 are secured to the hub 26 and are connected at their outer ends by a rim 29. Lower radial arms 30 are connected with the hub 27 and are connected at their outer ends with a rim 31. The rim 29 is also connected with the hub 27 by diagonal arms 32. The rims 29 and 31 are formed in straight sections and pairs of upstanding rods 33 connect these sections. The several arms thus connected produce an open structure through which heated gases may readily pass. Between each pair of upstanding rods 33 is arranged a plate 34, rigidly attached to the rims 29 and 31. Disposed inwardly of each plate 34 and spaced therefrom is a plate 35, rigidly attached to the diagonal arms 32 and the lower horizontal arms 30. The plates 34 and 35 have openings 36 and 37 formed therein to receive the articles 38 to be baked, such as cathode ray tubes. The openings 36 and 37 are arranged in radial pairs, as shown, and when the article 38 is held in these openings, in the low position, the article will be generally horizontal and inclined downwardly slightly, and this inclination increases as the article is elevated. Disposed inwardly of and spaced from the plates 35 are plates 39, which are attached at their upper ends to the hub 26 and at their lower ends to the arms 30. The plates 39 project downwardly below the arms 30 and terminate in close relation to the bottom 6. The plates 39 form a baffle to prevent heated gases passing inwardly beyond the plates 39 into the space 39ᵃ next to the shaft 22.

Secured to the lower end of the shaft 22 is a worm wheel 40, to turn the shaft 22 slowly and this worm wheel is driven by a worm 41, receiving rotation from any suitable source.

The operation of the oven is as follows:

The oven casing 5 is held stationary, while the rack or carrier 25 is continuously rotated, at a relatively low speed. When the burners 19 are lit the heated gases enter the bottom of the inclined oven casing 5 and rise therein and are trapped in the top portion of the inclined casing 5, providing a hot zone having its bottom defined by the horizontal line 21 and a cool zone beneath this line. The heated gases which are not trapped in the top portion of the casing 5 discharge through the opening 20. The low portion of the casing 5 adjacent to the opening 20 and beneath the horizontal line 21 is therefore the coolest portion of the casing. The rack 25 may be continuously rotated slowly in a clockwise direction, Figure 1, and as each plate 34 is brought opposite to the opening 20, the articles 38 are inserted into the openings 36 and 37. The articles are then carried by the rotating rack in a curved path through the casing 5 and since the carrier or rack rotates about a vertically inclined axis, the articles gradually rise within the casing 5, from a low point, to a high point, which is diametrically opposite to the opening 20. This high point is the hottest portion of the casing. The articles continue to rotate with the carrier or rack and are gradually lowered until they again reach the low point opposite to the opening 20, which is the coolest portion of the casing. The baked articles are removed from the carrier or rack and new articles introduced into their place. It is thus seen that each article when traveling through the oven casing is gradually heated to the maximum temperature and then gradually cooled to the minimum temperature, after which it is removed through the opening 20. The furnace may also be employed to anneal glass articles or the like. As the rack 25 is rotated, it has a lower arranged portion 25ᵃ traveling in the cool zone and an upper arranged portion 25ᵇ traveling in the hot zone. The products of combustion discharge directly into the casing 5 and contact with the articles, and the plates 39 prevent these hot gases passing into the space 39ᵃ, as stated.

It is to be understood that the form of my invention herewith shown and described is to be taken as a preferred example of the same and that various changes in the shape, size, and arrangement of parts may be resorted to without departing from the spirit of my invention or the scope of the subjoined claims.

Having thus described my invention, what I claim is:

1. In a rotary oven, an oven casing having a top and bottom and periphery, a vertically inclined shaft extending into the oven casing, a carrier arranged within the oven casing and mounted upon the shaft, the carrier having means for holding articles to be heated and being open for the passage of heat, means for discharging heated gases directly into the oven casing near its bottom, a baffle surrounding the shaft and disposed between the shaft and the heat discharging means, and means to rotate the shaft.

2. In a rotary oven, a vertically inclined oven casing having an opening in its side, a vertically inclined shaft extending into the oven casing, an open frame mounted upon the shaft to rotate therewith, outer plates mounted upon the frame and having openings to receive the articles to be baked, inner plates mounted upon the frame and having openings to receive the articles, a baffle disposed inwardly of the inner plates and mounted upon the frame and surrounding the shaft, heat generating means for the oven casing arranged exteriorly of the baffle, and means to rotate the shaft.

3. In a rotary oven, a substantially circular oven casing including a periphery which tapers upwardly and a vertically inclined top and bottom, said casing having its longitudinal axis vertically inclined, the lower disposed portion of the periphery being substantially vertically arranged, said lower disposed portion having an opening formed therein, the inclined top extending upwardly from the opening, said casing having a hot zone arranged principally above the opening, means for discharging heated gases into the oven casing and disposed adjacent to the bottom and the upper arranged portion of the periphery, the inclined top causing the gases to travel from the opening, a rotary carrier within the casing and having a vertically inclined axis of rotation disposed substantially centrally of the oven casing, and means to rotate the carrier.

4. In a rotary oven, a substantially circular oven casing including vertically inclined substantially parallel top and bottom and a periphery connecting the top and bottom, the lower arranged portion of the periphery having an opening formed therein, said casing having a hot zone arranged principally above the opening, means disposed adjacent to the bottom and upper arranged portion of the periphery for discharging heated gases into the oven casing, a vertically inclined rotary carrier arranged within the oven casing and substantially parallel with the top and bottom of the same, said carrier having passages for receiving the heated gases and having means to hold the articles to be heated, and means to rotate the carrier.

5. In a rotary inclined oven, an oven casing having a periphery provided with an opening in the lower arranged portion of the periphery, a support mounted within the casing and vertically inclined and having its lower arranged portion arranged adjacent to the opening, said support having a vertically inclined axis of rotation, said support including means to receive and hold articles generally horizontally when the articles are adjacent to said opening, and means for introducing heated gases into the bottom of the casing, the last named means being spaced from the opening and arranged adjacent to the upper arranged portion of the periphery.

6. In a rotary oven, a stationary support, a vertically inclined oven casing mounted upon the stationary support and including a vertically inclined top and bottom and a periphery connecting the top and bottom, the periphery being provided in its lower portion with an opening, the oven casing having a hot zone arranged principally above the opening, said bottom being provided with an opening, means disposed adjacent to the last named opening to supply heated gases into the lower portion of the oven casing, the means being accessible from the exterior of the bottom of the oven casing, a vertically inclined shaft disposed at substantially a right angle to the vertically inclined top and bottom and extending into the oven casing and projecting downwardly beyond the bottom to the exterior of same, means disposed beneath and exteriorly of the bottom to rotate the shaft, and a vertically inclined carrier arranged within the oven casing and substantially parallel with the top and bottom and mounted upon the shaft, said carrier having means to hold articles to be heated.

7. In a rotary oven, an oven casing having a central longitudinal axis which is inclined at an angle of substantially 30° from the perpendicular, said casing having a top and bottom and a periphery which is provided in its lower arranged portion with an opening which extends to near the top and bottom of the periphery, and a rotary carrier within the casing and having its axis of rotation inclined in the same direction with the central axis of the casing at an angle of substantially 30° from the perpendicular, the arrangement being such that an upper hot zone is provided within the casing arranged principally above the opening and a lower cool zone within the casing arranged principally below the top of the opening, the carrier having an upper arranged portion of its periphery disposed substantially entirely within the hot zone and a lower arranged portion of its periphery disposed substantially entirely within the cool zone, and means disposed adjacent to the bottom for introducing heated gases into the casing.

8. In a rotary oven, a substantially circular oven casing having a central longitudinal axis which is inclined at an angle of at least 30° from the perpendicular, said casing having a periphery provided in its lower arranged portion with a permanently uncovered opening which extends to near the top and bottom of the periphery, and a rotary carrier within the casing and having its axis of rotation inclined in the same direction with the central axis of the casing and at the same angle from the perpendicular, the arrangement being such that an upper hot zone is provided within the casing arranged principally above the opening and a lower cool zone within the casing arranged principally below the top of the opening, the carrier having a portion of its periphery arranged substantially entirely within the hot zone when such portion travels upwardly and substantially entirely within the cool zone when such portion travels downwardly and means for introducing heated gases into the casing.

9. In a rotary oven, a circular oven casing having a periphery which is approximately as long as the radius of the casing, and having a top and bottom, said casing having a central longitudinal axis which is inclined at an angle of approximately 30° from the perpendicular, said periphery having an opening in its lower arranged portion extending to near its top and bottom, a rotary carrier within the casing and having its axis of rotation inclined in the same direction with the central axis of the casing and at the same angle, said carrier having a periphery extending near to the periphery of the casing and a top and bottom extending near to the top and bottom of the casing, means to rotate the carrier and means for introducing heated gases into the casing, the arrangement being such that an upper hot zone is provided within the casing arranged principally above the opening and a lower cool zone within the casing arranged principally below the top of the opening, the carrier having a portion of its periphery arranged generally entirely within the hot zone when such portion travels upwardly and generally entirely within the cool zone when such portion travels downwardly.

CARL HERZOG.